ELECTRICAL RECORDING IN COLORS

Filed Oct. 30, 1947 2 SHEETS—SHEET 1

INVENTOR
Alfred N. Goldsmith
BY Olin L. Mitchell
ATTORNEY

INVENTOR
Alfred N. Goldsmith
BY Olin J. Mitchell
ATTORNEY

Patented Sept. 2, 1952

2,609,440

UNITED STATES PATENT OFFICE 2,609,440

ELECTRICAL RECORDING IN COLORS

Alfred N. Goldsmith, New York, N. Y., assignor to Radio Corporation of America, a corporation of Delaware Application October 30, 1947, Serial No. 783,074

13 Claims. (Cl. 178—5.4)

The present invention relates to methods of and means for recording electrical signals and, more particularly, although not necessarily exclusively, to novel methods of and apparatus for the recording of electrical signals simultaneously in or upon the surface of a recording medium, each signal or set of signals, for example, representing a component or primary color depiction of a piece of subject matter. The invention is concerned primarily with the simultaneous or substantially simultaneous recording of a plurality of sets of signals at spaced points on the signal recording surface or recording medium so that there is a precisely maintained relationship among the marks produced by the several sets of signals. This precise relationship, which enables exact registration of the various primary color recordings, is attained by the simultaneous operation of instrumentalities which are themselves fixed in position with respect to each other and, also, by reason of the substantial elimination of distortion, crumpling, creasing, or injury of the recording medium during the recording operation. The feature of multiple point recording obtained in accordance with the principles of this invention precludes distortion of the recording medium. It will, therefore, be seen that in practicing this invention the multiple recording results and the results of non-distortion in the recording medium are interdependent. The end result of this is that a multiple color recording with the component colors in perfect register, giving a reproduction in natural colors of an original subject, is possible for the first time in the art of photo or facsimile-telegraphy.

The principal object of this invention is to provide methods and apparatus for producing a recording in colors of a colored image, view, picture, or other subject matter.

Another object is to provide methods of and apparatus for sensitizing and subsequently desensitizing a recording member at high speeds and in a plurality of sharply defined localized areas simultaneously.

Still another object is to provide means for applying a plurality of fluids in sharply localized areas to the surface or body of a single recording medium.

A further object is to provide an electrical recorder having a novel means for sensitizing and desensitizing a recording member in a plurality of spaced sharply localized areas.

A still further object of the invention is to provide a plurality of means in a recorder for forming a plurality of movable nozzles or orifices, movements of which are accurately coordinated with respect to both velocity of movement and direction of movement.

A still further object is to provide a member for a helical recorder having fluid feeding slots of a novel configuration.

A still further object is to provide novel means for feeding the nozzle or orifice forming slots in a recording member.

A still further object is to provide a novel arrangement for supporting a plurality of recording electrodes on a single rotary member in a facsimile multi-color recorder.

Other and more specific objects of the invention will become apparent from a consideration of the following specification and claims in connection with the accompanying drawings illustrating one possible embodiment of the invention, in which:

Figure 1:
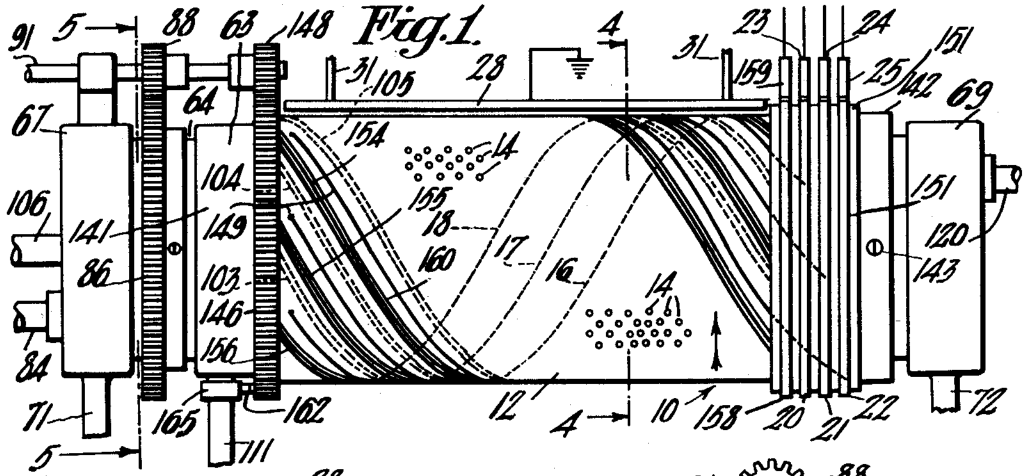
Fig. 1 is a front view of a facsimile recorder embodying the invention.
Figures 4, 5:
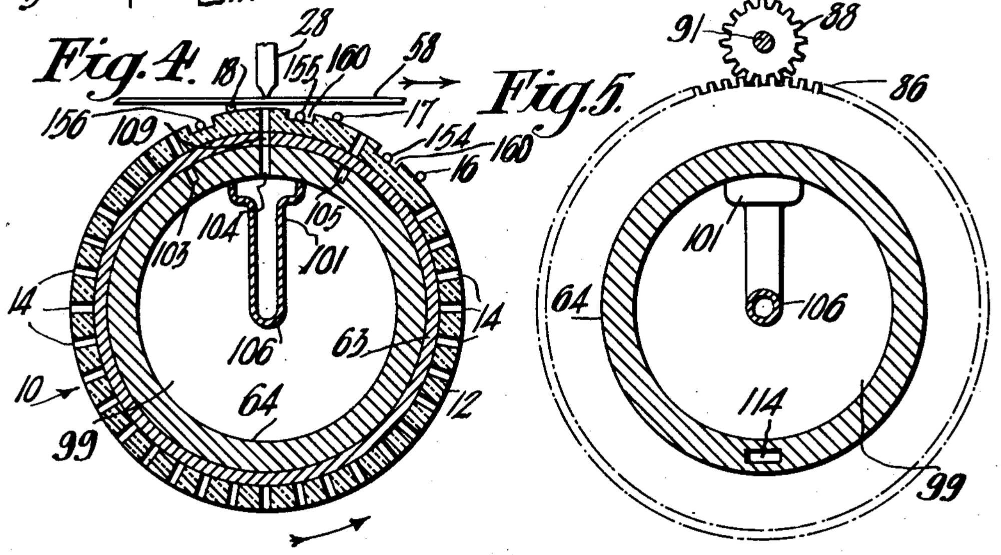
Figure 6:
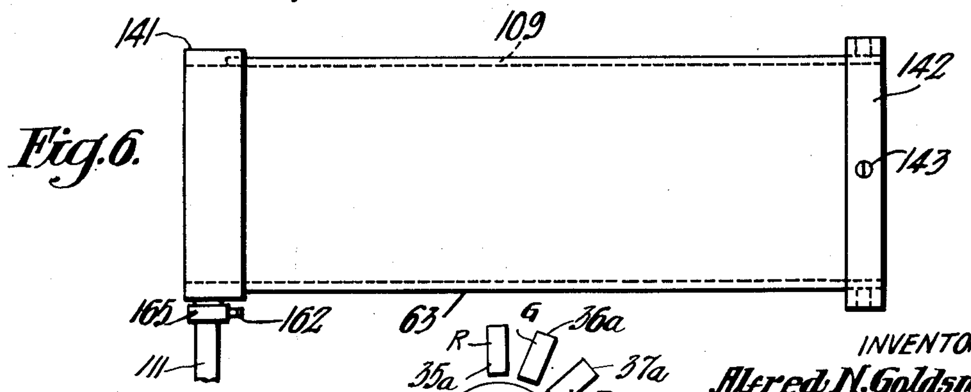
Figure 2A:
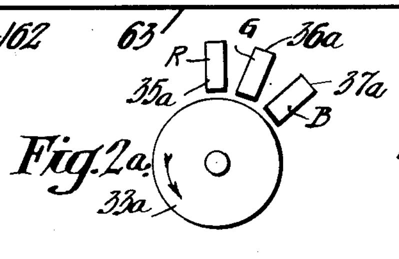
Fig. 2 is a diagrammatic showing of a system in which the machine of Fig. 1 may be used.
Figures 2, 3:
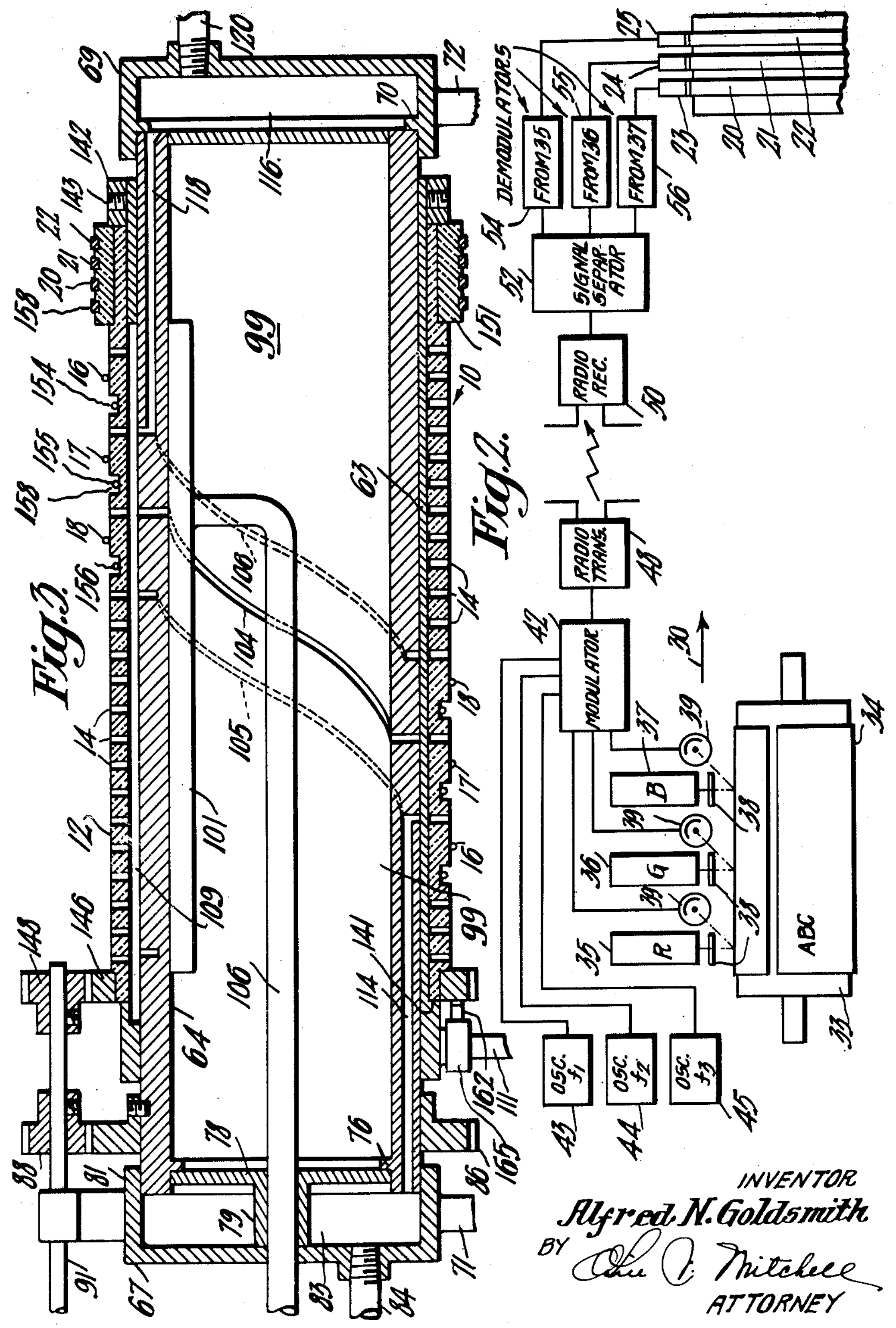

Fig. 2*a* shows, by way of example, a transmitter having a rotary drum;

Fig. 3 is a view in section of the recorder of Fig. 1;

Fig. 4 is a sectional view taken in the direction of the arrows 4—4 of Fig. 1;

Fig. 5 is a sectional view taken in the direction of the arrows 5—5 of Fig. 1; and Fig. 6 is a view in side elevation of the stationary slotted cylinder which cooperates with the cylinder of Fig. 1 to provide a plurality of nozzles in accordance with this invention.

The present invention employs certain of the features disclosed in the U. S. Letters Patent No. 2,602,016 for Electrical Recording, issued to the present inventor on July 1, 1952. The features disclosed and claimed in that patent are disclosed herein in a novel setting and by virtue of the improvements and additions set forth herein, new and unexpected results are attained over those set forth in that patent just referred to.

Referring to Fig. 1 of the drawings which are a part of the present application, there is shown, by way of example, a recording machine indicated in its entirety by reference character 10, which is suitable for the simultaneous production of a plurality of marks in accordance with a plurality of sets of facsimile signals. The individual recording organizations, of which there are a plurality in the present invention, are generally of the character described in U. S. Patent No. 2,215,806 granted to Charles J. Young, September 24, 1940. In accordance with the invention disclosed herein, the several recording organizations operate successively upon the recording medium with respect to spaced portions or areas of the recording medium but their operation occurs simultaneously or substantially so. The spacing is produced by mechanical phase displacement of these organizations in the machine. It is believed that spacially successive recording upon the surface or body of the recording medium by simultaneously or substantially simultaneously applied signal voltages or currents is a novel concept in the facsimile art. By way of example, and as discussed herein, these novel concepts are translated into ways and means for producing recordings which are in the natural colors of an original. As indicated above, the original may be a view or image, a picture, a map, drawing, or the like.

The machine 10 comprises a perforated recording drum member 12 of insulating material. The perforations 14 in the drum 12, which may be similar to the perforations 93 in Fig. 5 of Patent No. 2,602,016 referred to above, serve a purpose which will be later described. The drum 12 is equipped with three helical recording electrodes 16, 17, and 18 each of which comprises a wire, for example, secured as a helix to the surface of the perforated drum 12. The electrodes 16 to 18 are electrically insulated from each other but are suitably connected to slip rings 20, 21, and 22 contacted respectively by brushes 23, 24, and 25. In the illustrative embodiment, the helix 16 is connected to the brush 23, the helix 17 is connected to the brush 24, and the helix 18 is connected to the brush 25. A printer bar 28 cooperates with the three helical electrodes and is or may be carried by light pressure producing means (not shown) which reacts on movable supports of any desired character 31. The printer bar 28 is grounded in any suitable manner.

Referring to Fig. 2 showing generally an overall system for obtaining signals suitable for causing recording of an image in color for machine 10, a transmitter drum 33 carries a picture, map or other piece of subject matter 34 secured thereon in any suitable manner. A plurality of light-beam scanning devices 35, 36, and 37 each comprising an appropriate color filter 38 and a phototube 39 generate facsimile signals of amounts corresponding to the proportions of the three component colors appearing on the subject copy 34. Suitable filters may be those available commercially such as, for example, the Wratten filters A, B, and C corresponding to red, green, and blue respectively. The spacing of the scanning points of the scanners 35 to 37 along an element of the drum 33 parallel to its axis will, it will be understood, correspond to the spacing of the portions of each of the helices 16 to 18 which are in contact with the printer bar 28. The three portions of the helices in contact with the printer bar are preferably exceedingly small to insure good definition and resolution. The separations of the scanning points on the piece of subject matter 34 and on the record sheet 58 (Fig. 4) is preferably as small as practicable for reasons concerned with the invention to be discussed hereinafter. The outputs from the phototubes 39 may be fed to a modulator 42 so as to modulate frequencies $f_1$, $f_2$, and $f_3$ generated by oscillators 43 to 45. The output of the modulator 42 may be fed to a radio transmitter 48.

Reference character 50 designates a radio receiver of any known type which will demodulate the signal transmitted by the radio transmitter 48. This demodulated signal includes the image signal modulated frequencies $f_1$, $f_2$, and $f_3$ which are separated by a signal separator 52 and demodulated by detectors or demodulators 54, 55, and 56. The output of each demodulator is connected to one of the brushes 23, 24, and 25 so as to be applied selectively to the helical electrodes 16 to 18.

The separations of the scanning points on the subject copy 34 mounted on the drum 33, or its equivalent, are to correspond to the separations of the points of intersection of the three helices 16 to 18 with the printer bar 28. As pointed out above, the separations of the scanning points at both transmitter and recorder are preferably small to aid in avoiding distortion and to insure accurate register of the printing points. From this it will be seen that the arrangements of the reproducing or printing points in the receiver equipment of this system must be duplicated in the pick-up points at the transmitter whereby the color-separation facsio (image intelligence) signals are produced in the transmitting system. That is, the time (and fraction of a line) spacing of the reproducing points must be the same at transmitter and receiver, or else electrical delay means, for example, must be introduced at the transmitter to bring about the equivalent condition.

In the illustrative machine 10 and the system of Fig. 2, which is shown by way of example, the signals generated by the scanner 35 are applied to the brush 25, contact ring 22, and hence to the helix 18. The signals from the scanner 36 are applied to the brush 24, contacting 21, and hence to the helix 17. The signals from the scanner 37 are applied to the brush 23, contacting 20, and hence to the helix 16. For the arrangement shown in Fig. 1, with rotation of the cylinder 12 as indicated by the arrow, the drum 33 (Fig. 2) will remain stationary while scanning occurs axially of the drum as indicated by the arrow 30. Scanning in this case occurs on spaced scanning lines produced by intermittently rotating the drum 33.

Fig. 2*a* shows an arrangement in which a drum 33*a* is employed which rotates in the direction of the arrow at the same speed as the perforated drum 12 of Fig. 1 of the drawings. The three (for example) scanners 35*a*, 36*a*, and 37*a* correspond in function to the scanners 35, 36, and 37 of Fig. 2 but are spaced circumferentially around the drum 33*a*. In accordance with known practice, these several scanners will be mounted upon a carriage which moves axially of the drum and, therefore, the successive scanning points will be aligned upon a helix which is the scanning path of a scanning point in a scanner of this well-known type. The connections in the recorder will be as before so that 37*a* will provide a signal for helix 16, and so on in order.

It will be understood that the color filters 38 may be selected for best recording results. For example, the color filter associated with the scanner 35 may be red, that with the scanner 36, green, and that with the scanner 37, blue.

Since each of the elements so far described is well-known, per se, although they are associated in a novel manner in the present invention, they are illustrated herein more or les diagrammatically. Further details of the helical recorder with respect to paper feed means and other conventional features are to be found in U. S. Reissue Patent No. Re. 20,152 granted to C. J. Young on October 27, 1936. The recorder in this last named patent, however, relies on a transfer of marking material (e. g., carbon paper coating) to produce marks by a vibrating printer bar rather than by electrolytic or other processes which depend on direct application of electrical effects to the recording member or medium. A suitable form of transmitting scanner may be that of the type shown on pages 14–15 of the "Electrical Engineers Handbook," volume IV and volume V by Pender and MacIlwain, it being understood that the light transmitted through the transparency is analyzed as to its component colors, as described in connection with Fig. 2. The produced signals from the photo-tubes may be suitably amplified by methods well known in the art, and may be used to produce an amplitude modulated carrier wave as indicated in Fig. 2 and as typified by the arrangement as shown in U. S. Patent No. 1,988,472 granted to Maurice Artzt on January 22, 1935. It will also be understood that the drum 33*a* must run in synchronism and phase with the drum 12. Any known arrangement may be used to attain this result.

A recording member in the form of sheet or web 58 (Fig. 4) passes between the printer bar 28 and the drum 12 with its helical electrodes so as to have a substantially tangential contact with the instantaneously active sections of these electrodes.

The drum 12 is the outer one of three nested drums or cylinders 12, 63, and 64. The nested relationship of these drums is shown by Fig. 4 of the drawings. The inner drum 64 is rotatably mounted by end members 67 and 69 in a manner shown in detail by Fig. 3 of the drawings. Each of the end members 67 and 69 is provided with suitable fixed supports 71 and 72 respectively. These supports are mounted upon a suitable base (not shown) which is comprised within the general framework of the machine. This general framework may take any desired form depending on the mechanical design and a detailed showing is, therefore, omitted in the interest of simplicity.

Referring to Fig. 3, the drum 64 is provided with a narrow shoulder 76 which rests against a stationary disc 78 secured to or integral with a boss 79. The outer radial casing 81 of the support 67 is cylindrical as shown to provide a bearing surface for the end of the drum 64. A cavity 83 is provided, which is in communication with a suitable conduit 84. A similar structure is present in the support 69 except that the boss 79 and the disc 78 are not needed to support the conduit 120 to be referred to later herein. End thrust of the drum 64 is taken by a flange 70.

The drum 64 has secured thereon or formed integrally therewith a ring gear 86. Rotation for scanning purposes is imparted from a pinion 88 to the drum 64 through the gear 86. The pinion 88 may be driven from a shaft 91 which is operatively connected to any suitable source of mechanical power synchronous with the remote signal generator, for example, the facsimile scanner of Fig. 2 or Fig. 2*a*. It will be understood by those skilled in the art that the rotational speed of the drum 64 is correlated with the speed of travel of the sheet 58 in a manner to obtain scanning, the means of so doing being well known in the art.

The inner cylinder 64 of the embodiment chosen for illustrating one form of which the means for carrying out my invention may take is hollow in the sense that it is provided with a cylindrical cavity 99 (Figs. 3, 4, and 5). The inner cylindrical wall of this hollow cylinder provides a bearing surface for a stationary elongated feed nozzle or orifice 101.

The cylinder 64 is provided with three fluid feed means in the form of grooves 103, 104, and 105. In the illustrative embodiment of the drawings, the groove 104 is in reality a helical slot providing communication with the elongated orifice or nozzle 101 referred to immediately above. The elongated orifice or nozzle 101 is in communication with a conduit 106 which extends through the boss 79 in the end piece 67. The rotary cylinder 64 bearing the grooves 103 and 105 and the slot 104 is surrounded by the previously mentioned stationary cylinder 63 which is provided with an elongated slot 109 (Figs. 3 and 6) preferably closed at both ends. The grooves, as shown, have a depth less than the thickness of the cylinder. The slot, however, passes through and perforates the entire thickness of the cylinder. Rotation of the cylinder 63 is prevented by a bracket or support 111 which is or may be secured to the general framework (not shown) of the machine 10. The groove 105 is also placed in communication with its particular supply of appropriate fluid by way of the previously described conduit 84. This is accomplished by having the groove 105 terminated in a passage 114 which communicates with the interior 83 of the end piece 67 thus forming a sort of entry port or manifold. The groove 103 is similarly in communication with the hollow interior (or manifold) 116 of the end piece 69 by way of a passage 118. The fluid is supplied to the groove 103 from a conduit 120. The grooves 103 and 105 are, in effect, closed terminated grooves inasmuch as they end within the length of the slot 109 in the stationary cylinder 63.

The slot 109 is preferably quite narrow and, in effect, it may be comparable in width to the width of the extremely narrow scanning lines which are traced on the sheet 58 (Fig. 4) at the moving points of contact between the helical electrodes 16, 17, and 18 and the stationary printer bar 28. The grooves 103 and 105 and the slot 104 are suitably spaced from their corresponding helices 16, 17, and 18 respectively. The external longitudinal openings or elongated orifices on the grooves 103 and 105 and the slot 104 are comparable in width to the width of the slot 109 so that very fine openings, which travel in the direction of the length of a scanning line, are provided. The mechanical phase relations of the grooves and slots in the drum 64 are such, for each of the three nozzle or orifice forming means in the cylinder 64, that a jet of fluid, (heated vapor for example) impinges upon the sheet 58 sufficiently ahead of the recording areas or points provided by the electrodes 16, 17, and 18 and on a minute area of the sheet 58 to produce sensitization sharply restricted to these minute areas.

The direction of rotation of the drum 12 and 64 is indicated on Figs. 1 and 4 of the drawings whereby the traveling minute sensitizing areas and the traveling scanning spots or elemental recording areas follow each other across the sheet 58. Direction of movement of the paper 58 is also indicated, but this is optional. In general, the usual procedures may be followed in designing a helical recorder with respect to design, mounting, and insulation of the recording helices, and the design and mounting of the printer bar. In the illustrative example, the printer bar 28 is grounded, for example, by being connected to an appropriate metallic part of the recorder.

The design of the drum 12 will depart from that of prior art recorders to permit operation in conjunction with the inner members, for example, the cylinder 64, which presents the helical slots 103, 104, and 105 for cooperation with the linear slot 109 in the cylinder or sleeve 63 to provide what, in effect, is a series of accurately coordinated capillary nozzles or orifices traveling recurrently and synchronously with the accurately coordinated scanning points and at a high speed.

Figs. 1, 3, and 4 show the perforated insulating drum 12 which is previously described as rotatably seated on the stationary cylinder 63. As is clearly shown in Fig. 3 the stationary cylinder 63 (Figs. 3 and 6) is provided with a shoulder 141 which provides a thrust bearing for the rotatable cylinder 12. A collar 142 is detachably secured by any suitable means, for example, a plurality of set screws 143, to provide a thrust bearing for the opposite end of the rotatable cylinder 12. It will be understood from the parts previously described that the cylinder 64 rotates within the cylinder 63 and furnishes fluid to the slot 109 which cooperates successively with the helical grooves 103, 104, and 105.

Referring again to Figs. 1, 3, and 4 for a more complete description of the rotatable drum 12, it is provided with an external gear 146 which is preferably of metal and is secured in any suitable manner to the insulating body of the cylinder. The movement of rotation, in phase and in synchronism with the cylinder 64, is imparted to the cylinder 12 through a pinion 148 (Fig. 1) which meshes with the gear 146. The gear and pinion combination 146 and 148, therefore, will be identical in purpose and general construction with the gear and pinion combination 86 and 88. The previously described helices 16, 17, and 18 should establish helical paths about the cylinder 12 in a manner which is by now well-known in connection with a single helix recorder. Considering, for example, the helix 16, it is or may be in the form of a conductive wire of durable and non-corrodible material anchored at one end 149 to the cylinder 12. The opposite end of the helix 16 is passed axially through a hole (not shown) in the enlarged slip ring carrying portion 151 of the cylinder to be electrically and mechanically connected to the slip ring 20. In a like manner, the helix wire 18 is connected to the slip ring 22 and the helix wire 17 is connected to the slip ring 21. The order of connection is important when a record in colors is to be obtained and, therefore, throughout the foregoing and what is to follow, the helix wires, fluid slots, and the connections to the helix wires and fluid slots are set forth in a predetermined order. It will be understood, however, that the order may be varied provided that consistency is maintained in applying the correctly selected electrical signals which correspond to the particular color sensitization by each of the applied fluids.

The extremely localized desensitizing which is to occur immediately after successive recordings, each in progressive elemental areas, as recording progresses at high speeds, is accomplished by a mobile means which is effective in synchronism with the recording means but retarded in phase. Heat may be applied, so that it is effective for desensitizing in localized areas, by wires heated by an electric current as shown in my Patent No. 2,602,016 referred to previously.

Heat for extremely localized desensitizing is provided in the illustrative machine of Fig. 3 by resistance ribbons or wires 154, 155, and 156 each of which is wound as a helix around the drum 12. Usually, a one-turn helix will be sufficient. Inasmuch as the several heating wires are similar in all respects, only one, the wire 155, will be described in detail. The wire 155 may be recessed in a helical groove 160 in the drum 12 so as to prevent direct contact with the surface of the record sheet when this is desirable. This arrangement, as shown in the drawings, provides a radiative recessed heater.

The wire 155 is slightly backed in phase relative to corresponding recording helix 17. One end of the helix wire 155 is electrically and mechanically connected to the gear 146 which provides a convenient slip ring surface. For this reason the gear 146 is preferably of brass or similar metal of relatively high conductivity combined with physical properties making it suitable for use as a gear. The other end of the wire 155 is mechanically and electrically joined to a slip ring 158 (Figs. 1 and 3) contacted by a brush 159 (Fig. 1). It will be understood that the wires 154 and 156 as well as the wire 155 are connected to the gear 146 and the slip ring 158. Fig. 1 illustrates an arrangement for obtaining connection of the gear 146 electrically with the grounded metallic part of the machine such as the bracket 111. A collar 165 is secured on this bracket and is provided with a recess to accommodate a brush 162 which is pressed against the exposed axial face of the gear 146 by suitable resilient means such as a compression spring (not shown). The brush 159 may be placed in communication with one terminal of a power supply source capable of providing sufficient current to heat the wires 154, 155, and 156. If this suggested method connection is adopted, the remaining terminal of the power supply and the brush 162 may be grounded by a metallic portion of the machine.

In operation of the machine of Figs. 1 and 3 to produce color reproductions in facsimile, different fluids capable of producing different colors under the action of electrical recording current are introduced into the several slots of the cylinder 64. By way of example, the three colors to be printed in order to obtain a recording in representative colors of the original are xanth (yellow), magenta (purplish red), and cyan (green blue). The order given is the order of delineation capability and, therefore, is the preferred but not obligatory order in which recording occurs. Referring to Fig. 1 of the drawings, and with the direction of rotation of the cylinder noted, the helical recording wire 16 will be provided with signals for the xanth recording, the helical wire 17 will be provided with signals for the magenta recording, and the helical wire 18 will be provided with signals for the cyan recording. The centrally located conduit 106 will be provided with the magenta sensitizing solution, the conduit 84 will be provided with the xanth sensitizing solution or fluid, and the conduit 120 will be provided with the cyan sensitizing fluid or solution.

In the following, the fluids or solutions will be designated as fluids 1, 2, and 3 which, in the illustrative example, will be understood to correspond respectively to the xanth producing solution, the magenta producing solution, and the cyan producing solution. Moreover, in the illustrated system of Fig. 2, fluid 1 will be projected just ahead of the wire 16 so that signals from the scanner 37 will be recorded. Fluid 2 will be projected adjacent to the wire 17 so that this wire will be active with the scanner 36. Fluid 3 will be projected adjacent to the wire 18 so that it will be active to record the signals produced by the scanner 35. Immediately following each recording point at the intersection of the helices and the printer bar, the heating wires will be active to produce desensitization.

Having now described the invention, what is claimed and desired to be secured by Letters Patent is the following:

1. In a recorder, recording means for recording in a plurality of successive elemental areas of a recording medium, said plurality of successive elemental areas being spaced apart on said recording medium, means for producing relative scanning movement between the recording means and the recording medium, means providing a plurality of orifices of the order of image-elemental dimensions, means for supplying a separate sensitizing fluid to be projected from each orifice to the recording medium, and means to correlate the elemental area recording operations of the recording means and the fluid projection function of the orifices.

2. In a recorder, recording means for recording in a plurality of successive elemental areas of a recording medium, said plurality of successive elemental areas being spaced apart on said recording medium, means for producing relative scanning movement between the recording means and the recording medium, rotary means for providing a plurality of orifices of the order of image-elemental dimensions, slot and groove means for supplying a separate sensitizing fluid to be projected from each orifice to the recording member, and means to correlate the elemental area recording and the recording means and the fluid projection function of the orifices.

3. In a recorder, recording means comprising a printer bar and a plurality of recording helices, the mechanical phase relations of which are such as to provide for recording in a plurality of closely spaced successive elemental areas of a recording medium, means for producing relative scanning movement between the recording means and the recording medium, means for providing a plurality of closely spaced successive orifices of the order of image-elemental dimensions, means for supplying a separate sensitizing fluid to be projected from each orifice to the recording medium, and means to correlate the elemental area recording operations of the recording means and the fluid projection function of the orifices.

4. In a recorder, recording means for recording in successive elemental areas of a recording medium, means for producing relative scanning movement between the recording means and the recording medium a plurality of orifices of the order of image-elemental dimensions, means for supplying a separate sensitizing fluid to each orifice, a plurality of means, each of said means being disposed to be effective following a recording operation produced by said printing member for treating the recording, and means to correlate the elemental area recording operation of the recording means, the fluid projection function of the orifices, and the operation of said treating means.

5. In a recorder, recording means providing for recording in a plurality of spaced elemental areas on a recording medium, means for producing relative scanning movement between the recording means and the recording medium, means for applying a plurality of desensitizing effects to the plurality of successive elemental areas recorded upon by the recording member, and means to correlate the successive elemental area recording operation of the recording means with the elemental area operation of the desensitizing means, so that for each of the given elemental area recording operations, desensitization succeeds recording throughout the scanning operation produced by the relative scanning movement.

6. In a recorder, a plurality of closely spaced recording means providing for recording simultaneously in a plurality of successive elemental areas of a recording medium, means for producing relative scanning movement between the recording means and the recording medium, a plurality of mobile orifices of substantially capillary dimensions, means to supply sensitizing fluids for projection through each of said orifices, and means to correlate the elemental area recording operation of the plurality of recording means and the fluid projection function of the mobile orifices.

7. In a recorder, recording means providing for recording simultaneously in a plurality of elemental areas of a recording medium, means for producing relative scanning movement between the recording means and the recording medium, a plurality of mobile orifices of substantially capillary dimensions, means to supply a sensitizing vapor for projection through each orifice upon said recording medium in elemental areas thereof, a plurality of means operable in successive elemental areas of the recording medium to desensitize the same, and means to correlate the elemental area recording operation of the recording means, the fluid projection function, the mobile orifice and the desensitizing operation of the desensitizing means.

8. In a recorder, a plurality recording means providing for recording in successive elemental areas of a recording medium, means for producing relative scanning movement between the recording means and the recording medium, means for applying a desensitization effect to successive elemental areas of the recording medium immediately following a recording operation of each of the recording means, and means to correlate the successive elemental area recording operation of the several recording means with the elemental area operation of the several desensitization means so that for each given elemental area, desensitization succeeds recording throughout the scanning operation produced by the relative scanning movement.

9. A facsimile system for producing a record in facsimile, the said record presenting colors of the original copy, comprising means for generating a plurality of series of facsimile signals, each series being representative of one of a plurality of component colors of the original subject copy, means for combining and transmitting said series of signals, means for receiving and separating said series signals, a recorder having a plurality of simultaneously operating recording means, each means being in the form of a sensitizing, recording and desensitizing assembly, said assemblies being closely adjacent and moblie and properly phased in motion and position, a recording medium, means correlated with the movement of said assemblies to produce scanning of said recording medium by said assemblies.

10. A recorder for operating as a combined sequential-and-simultaneous color facsimile recorder comprising a plurality of recording means for impressing a plurality of colors on a recording medium at successive points in a scanning line on the recording surface of said medium, each means comprising a separate helix, each helix cooperating with a common printer bar, and means for causing line by line scanning of the recording medium to provide an orderly sequence of scanning lines on said recording medium thereby to obtain the effect of simultaneous color recording.

11. A facsimile recorder comprising a rotary drum pervious to fluids, a plurality of recording helices on said drum, a single printer bar cooperating simultaneously with said helices, a second rotary drum nested within said first drum and movable therewith, a stationary drum separating said two rotary drums, said stationary drum having a slot therein disposed opposite said printer bar when it occupies its operative position, and a plurality of fluid guiding slots in said inner rotary cylinder advanced in mechanical phase with respect to said helices.

12. A facsimile recorder comprising a rotary drum pervious to fluids, a plurality of recording helices on said drum, a single printer bar cooperating simultaneously with said helices, a second rotary drum nested within said first drum and movable therewith, a stationary drum separating said two rotary drums, said stationary drum having a slot therein disposed opposite said printer bar when it occupies its proper position, a plurality of fluid guiding slots in said inner rotary cylinder, advanced in mechanical phase with respect to said helices, one of said slots being in the form of a slit, bearing housings, one at each end of said second rotary drum, a fluid connecting to each of said housings, a conduit entering said second rotary drum, means on said conduit to cooperate with said slit, and means placing each of said housings in fluid conducting communication with a separate slot.

13. A facsimile recorder comprising an electrically insulating rotary drum pervious to fluids, a plurality of conductive recording helices on said drum, a single conductive printer bar cooperating simultaneously with said helices, a second rotary drum nested within said first drum and movable therewith, a stationary drum separating said two rotary drums, said stationary drum having a slot therein disposed opposite said printer bar when it occupies its operative position, and a plurality of fluid guiding slots in said inner rotary cylinder advanced in mechanical phase with respect to said helices.

ALFRED N. GOLDSMITH.

REFERENCES CITED

The following references are of record in the file of this patent:

UNITED STATES PATENTS

| Number | Name | Date |
|---|---|---|
| 1,627,701 | Hall | May 10, 1927 |
| 1,841,452 | Ranger | Jan. 19, 1932 |
| 1,941,001 | Hansell | Dec. 26, 1933 |
| 2,100,204 | Shore | Nov. 23, 1937 |
| 2,213,876 | Young | Sept. 3, 1940 |
| 2,227,109 | Shankweiler | Dec. 31, 1940 |
| 2,278,940 | Murphy | Apr. 7, 1942 |
| 2,413,706 | Gunderson | Jan. 7, 1943 |
| 2,431,360 | Philpott | Nov. 25, 1947 |